July 14, 1959

R. L. NASH 2,894,677

ROTARY COMPRESSOR CONTROL

Filed Oct. 16, 1956

INVENTOR
Richard L. Nash by Raymond G. Mullee

ATTORNEY

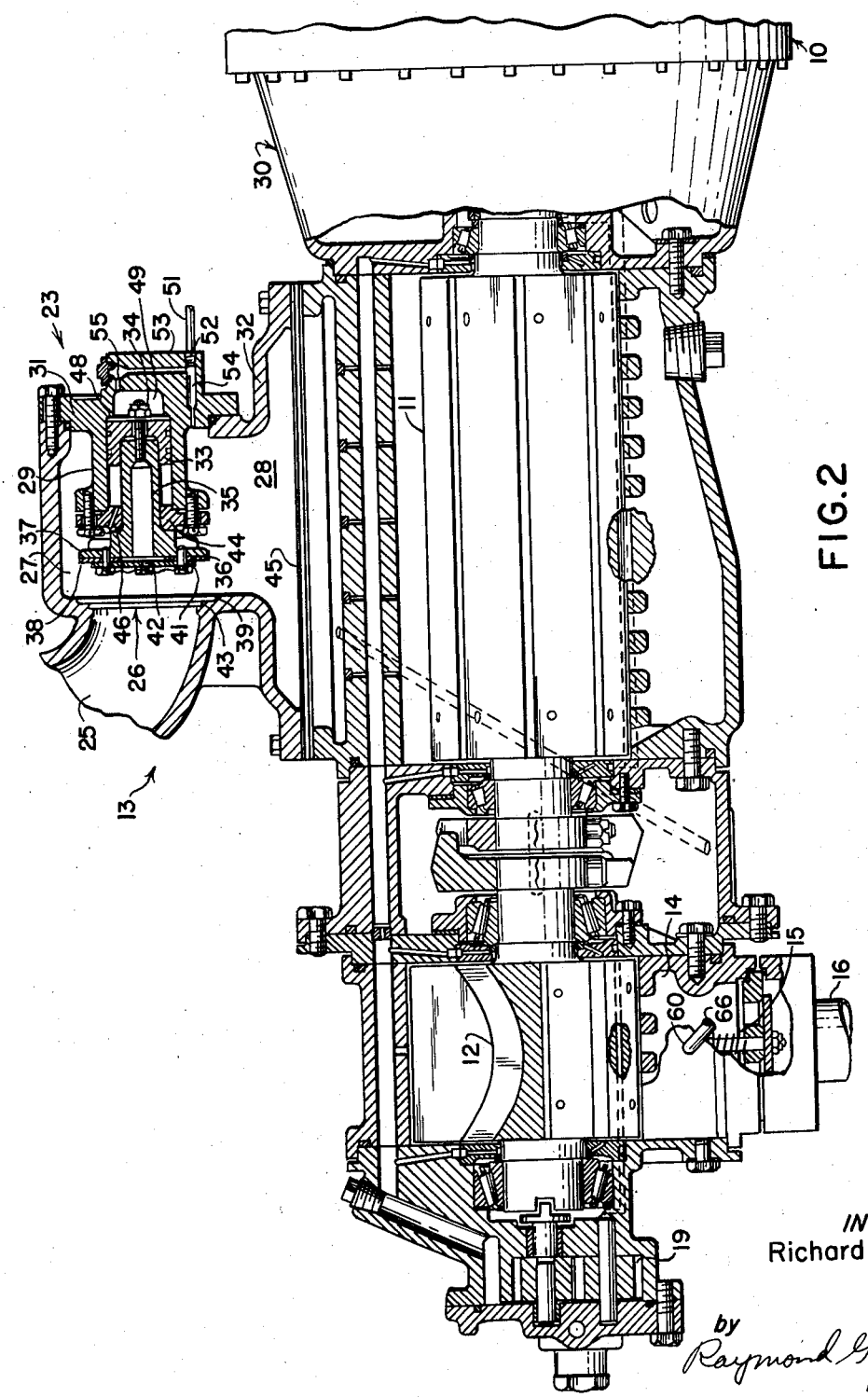

July 14, 1959  R. L. NASH  2,894,677
ROTARY COMPRESSOR CONTROL
Filed Oct. 16, 1956  3 Sheets-Sheet 3
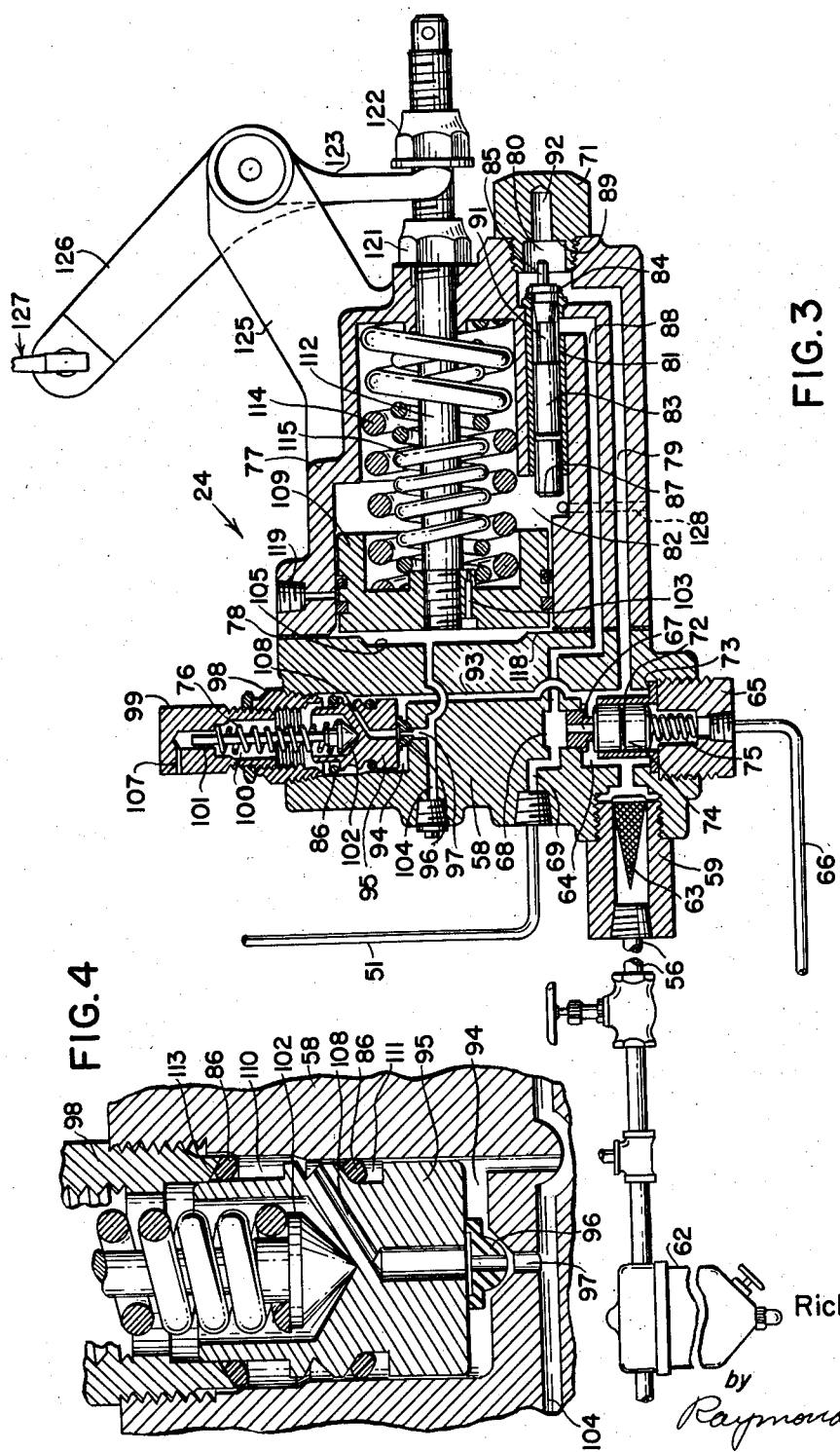
INVENTOR.
Richard L. Nash
by Raymond G. Mullee
ATTORNEY

United States Patent Office

2,894,677
Patented July 14, 1959

2,894,677

ROTARY COMPRESSOR CONTROL

Richard L. Nash, Franklin, Pa., assignor to Chicago Pneumatic Tool Company, New York, N.Y., a corporation of New Jersey Application October 16, 1956, Serial No. 616,289

7 Claims. (Cl. 230—3)

This invention pertains to rotary air compressors. It is more particularly concerned with novel and compact mechanism for controlling the speed of operation of the compressor as well as the intake of air to the compressor.

A feature of the mechanism is a certain cooperation of elements whereby the speed of the compressor is gradually reduced when the receiver pressure rises above a certain value, and whereby the speed is further reduced and the intake air flow to the compressor is gradually throttled as the receiver pressure rises above another certain value at a higher level.

A further feature of the mechanism is a control assembly having a novel unitary housing incorporating a plurality of cooperating elements in a desirable arrangement whereby the speed of the compressors and the air inflow to the latter are controlled.

A general object of the invention is, therefore, to provide improved and novel means for controlling the speed of rotary air compressors in air compressing apparatus and for regulating the flow of intake air to the compressors.

This control automatically varies the speed of the engine and the intake unloading to control the output of the compressor in direct proportion to the demand for air. Thus complete regulation is provided for by a proportional reduction in speed from full capacity down to approximately 60% capacity and then by a combination of further speed reduction and gradual closing of the intake valve down to zero capacity.

The gradual unloading speed control never lets the machine operate at a speed that is higher than necessary to deliver the required amount of air at any one instant. After the engine has reached its minimum speed and a small amount of air is being used from the receiver, the engine will continue to operate at reduced speed while the unloading intake valve is positioned to allow the compressor to meet a part load demand. Also, the unloading intake valve automatically closes whenever the machine shuts down due to normal stopping, lack of fuel or emergency shut down. This positive closing of the intake valve, when the compressor is not operating and air pressure is in the receiver, prevents the compression chambers from filling with oil and overflowing out of the air intake.

A still further object is to provide an efficiently operating device for accomplishing the above purposes, which is compact in structure and arrangement, occupies a minimum of space, and comprises a minimum of parts.

A still more particular object of the invention is to provide a control assembly for controlling the speed of the compressor and air inflow to the compressor which is housed in a unitary structure whereby the various components thereof are readily accessible for repairs and replacement without dismantling the entire control assembly.

The invention further lies in the particular construction of its various elements as well as in their cooperative association with one another to effect the benefits intended herein.

The foregoing and other objects and advantages of the invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

In the drawings:

Fig. 2 is a longitudinal section through the compressor;

Fig. 3 is a longitudinal section through the control assembly; and

Fig. 4 is a fragmentary view, on an enlarged scale, of the pressure transformer, showing the piston valve thereof in operated position.

Figure 1:
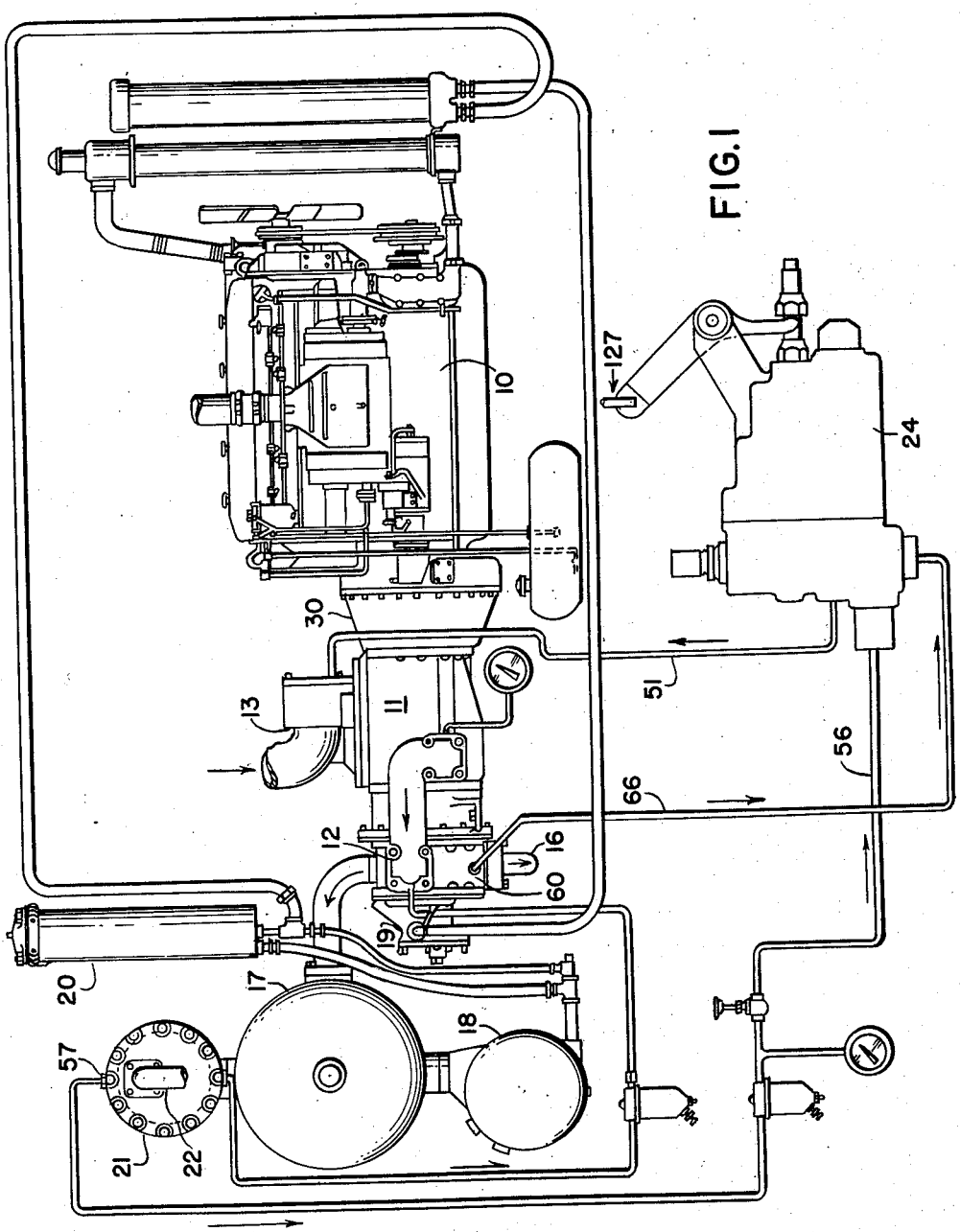
Fig. 1 is a schematic view of rotary compressor apparatus in which the invention is incorporated.

In describing the invention in further detail, reference is now directed to Figs. 1 and 2 of the drawings wherein there is shown an engine 10 arranged to drive through suitable clutch means 30 a double stage air compressor 11, 12 of the rotary vane type. This is adapted to compress air received from an intake section 13. The compressed air is discharged from the chamber 14 of the high pressure stage 12 through a one-way check valve 15 to piping 16 leading to a receiver tank 17. The apparatus further includes an oil supply tank 18 from which oil is drawn by a gear pump 19 drivingly connected to the compressor drive. The oil is drawn through a suitable cooling system 20 and pumped through passages to ports from where it issues in a fine spray into the compressor chambers to cool the air in process of compression. The compressed air that is piped to the receiver tank is accordingly charged with oil. The compressed air flows, without drop in pressure, from the receiver to a connected oil separator tank 21. The oil settles out and is returned by various piping to the oil supply system. Pressure air, upon demand, is drawn from the separator tank 21, through an outlet port at 22.

The operating speed of the compressor, and the flow of air through the intake section 13 to the compressor is controlled by suitable means now about to be described. In general, this means comprises an intake air flow control valve 23 (Fig. 2) and a control assembly 24 (Fig. 3). The control assembly is operable, upon the pressure in the receiver or separator rising to a certain value, to reduce the speed of the compressors; it is further operable, upon further rise in the separator pressure, to simultaneously further reduce the speed of the compressors and to cause the intake valve to cut down intake air flow to the compressors.

The intake section 13 which houses the intake valve 23 includes an intake air passage 25 communicating through valve seat opening 26 to the intake valve chamber 27. The lower portion 28 of the latter chamber communicates through a screen plate 45 with the chamber of the first compressor stage 11. The intake valve regulates the flow of air through the opening 26 to the compressor. The intake valve assembly includes a cylinder 29 which extends into the intake chamber. The cylinder opens out through one end in axial alignment with the opening 26. Cylinder 29 is closed over at its opposite end by a radially enlarged end wall 31 which seals over an opening in the housing wall 32 of the intake chamber. Slidable in the cylinder 29 is a piston 33 axially mounted by bolt and nut 34 to an end of a hollow stem 35 of a valve head generally indicated at 36. The stem 35 opens out through a radially enlarged end wall 37 of the valve head. To the outer face of end wall 37 is mounted a sealing ring 38 adapted to seal over an annular seat 39 formed about the opening 26. A disc 41 of smaller diameter is mounted to the face of the sealing ring and, except for a bleeder hole 42, covers over the end opening of the valve stem 35. Disc 41 is adapted to seal over an annular seat 43 which is stepped in from the outer seat 31. To the forward end of the piston cylinder 29 is mounted a collar 44 in which the piston stem 35 is slidably borne. An orifice 46 through the collar vents the space at the left of the piston 33 so as to avoid sluggish movement of the latter. In the fully opened position of the intake valve, the piston limits against an annular shoulder 48 formed about a pressure build-up well 49 in the end wall 31. The intake valve is moved to its fully open position, as appears in Fig. 2, by intake air flow drawn through the intake opening 26 by the suction of the compressors. It is adapted to be moved gradually to its closed position by pressure air passed through a pipe line 51 which connects with a port 52 in a bossed extension 53 of the end portion 31 of the intake valve assembly. Port 52 communicates by a passage 54 directly with a reduced orifice leading into the lower portion 28 of the intake chamber. A radial branch from passage 54 opens by a lateral reduced orifice 55 to the rear of the pressure build-up well 49 at the back of the piston. The opposite end of piping 51 connects through the control assembly 24 with a pressure output line 56 of the separator tank 21.

The control assembly 24 comprises (Fig. 3) a housing including a block section 58 having an inlet port fitting 59 which connects by piping 56 through air filter means 62 to an outlet 57 of the separator. A cone filter 63 is provided in the fitting 59. The filters 62, 63 serve to clean any remaining particles of oil from the separator air. The inlet port 59 communicates with a chamber 64 which is closed at its bottom by a plug 65 having a through bore which connects by a pipe line 66 with a discharge port 60 of the high pressure compression chamber 14. A passage 67 through the top wall of chamber 64 connects with a well 68 in a passage 69 that connects by an outlet port with the piping 51 leading to the intake valve assembly 23. A bushing 72 is disposed in chamber 64 and is held therein free of the top and surrounding walls of the chamber by means of a bottom flange 73 sandwiched between the plug 65 and a shoulder of the block section 58. Slidable in the bushing is an automatic unloader slide valve 74 which is loaded by a spring 75 to seat its top end over passage 67. Pneumatic pressure from the high pressure chamber through line 66 aids the spring in holding valve 74 seated.

Mounted to the housing block 58 is a bell housing section 77 which is sealed to the latter by gasket 78. A passage 79 leads from the unloader valve chamber 64 through the wall of the bell section to a piston chamber 80 which is closed over at one end by a cap nut 71. The opposite end of chamber 80 opens through an elongated bushing 81 into an enlarged chamber 82 of the bell section. Slidable in the bushing is an elongated piston 83, the head end 84 of which projects into the piston chamber 80. The head of piston 83 is characterized by a reduced guide pin 85. In the normal position of the piston the head end 84 seats over the adjacent end of bushing 81, and a short opposite end portion 87 of the piston projects into the bell chamber 82. A little to the left of the seat of bushing 81 is a radial port which communicates by a passage 88 through the wall of the bell section with the well 68 in the passage 69 leading to the intake valve assembly 23. Pressure air passing from the separator tank through piping 56 to the automatic unloader valve chamber 64 passes around the unloader valve to the passage 79 from where it flows to the chamber 80 at the head of the piston 83 and normally holds the latter seated. Movement of the piston 83 to the right will progressively communicate, by means of an annular grooved section 91 in the piston, the passage 79 with passage 88. The cap nut 71 is provided with a recess 92 to freely accommodate the guide pin 85 of the piston as the latter moves to the right. A shoulder 89 of the cap nut, engageable by the head end of the piston, limits the movement of the latter. The manner in which piston 83 is caused to move will be described herein in its proper sequence.

A further branch passage 93 leads off from the automatic unloader valve chamber 64 and passes through the block section 58 to a restricted space 94 below a pressure transformer piston valve 95. Piston valve 95 has a short projecting nose 96 on its underside serving as a valve head which normally seats over a passage 97. Space 94 is the lower portion of a bore 100 which opens out through the top of the housing block section 58. Threaded into the open end of this bore is an open ended fitting 98 which is plugged by a cap nut 99. A piston guide rod 101 having one end freely slidable in a recess of the cap nut is tipped at its opposite end by a cone 102 abutting the bottom of a well formed in the top end of piston 95. A spring load 76 about the guide rod normally seats the nose of the piston over the passage 97. Passage 97 communicates space 94 with a passage 104 connected with a pressure build-up well 105 formed at the left end of the relatively enlarged chamber 82 of the bell section.

About the body of valve 95, as more clearly shown in the enlarged view of Fig. 4, are conventional type annular seal or O-rings 86 in spaced relation to each other. These rings 86 are made of soft material and serve to seal the valve 95 to the bore in the block section 58, yet are sufficiently resilient to permit a very slight upward and downward movement of this valve. There is normally no leakage of air past these rings. In case of any slight imperfection, which would result in leakage of air into the space 100 above valve 95, this leakage air is vented away by port 107 in part 99.

Pressure air from the separator tank passing through branch 93 flows to space 94 where its acts pressure-wise on the lower face of valve 95, tending to lift the valve against spring 76. When the pressure air from the separator builds up beyond a certain value in space 94, the valve 95 rises very slightly, permitting some air to pass restrictedly past the valve nose 96 into passages 97, 104, and space 105. The pressure developed in passage 97 flows through the hole in valve nose 96, and through passage 108 where its acts around the outside of valve 95, in an annular space 110 between the two seal rings 86. The pressure in passage 108 and recess 110 is reduced as compared with the receiver pressure in space 94 and this difference in pressure holds the nose piece 96 firmly against the piston 95. The lower seal ring 86 is constantly forced upward against the conical side of an annular groove 111 in piston 95 by the preponderance of pressure in space 94 over that in the space 110. This forces the lower soft sealing ring 86 outward against the cylinder wall of block 58. This lower ring 86 moves substantially in unison with the piston 95. This pair of parts has an effective pressure area corresponding to that of the cylinder bore diameter in block 58.

The upper sealing ring 86 is held constantly upward against the conical underface 113 of fitting 98 by the preponderance of pressure in annular space 110 over atmospheric pressure in space 100. This conical underface forces the sealing ring inward to seal on the piston 95. The upper sealing ring 86 is substantially stationary with its support surface 113 in fitting 98. Any movement of piston 95 occurs with a slight slipping or creeping of the piston in the inside diameter of the upper sealing ring. The pressure area at this seal is that corresponding to the inside diameter of the upper sealing ring 86.

Since the lower soft sealing ring 86 has an effective pressure area greater than that of the upper ring 86, the reduced pressure (less than receiver pressure) in the annular space 110 between the rings produces a downward force on the piston 95 equal to the product of the reduced pressure multiplied by the difference between the effective areas at the upper and lower seal rings 86. The relationship between this downward force and the other forces acting on the piston will now be described.

Piston 95 is urged upward by:

A. Receiver pressure in space 94 acting on the bottom of the piston over an annular area surrounding the seat for nose piece 96; and B. Reduced pressure in passage 97 acting (when the nose piece 96 is not seated) upon the area within the seat for the nose piece.

At the same time the piston 95 is urged downward by:

C. The compression spring 76; and

D. Reduced pressure in annular chamber 110 acting over an effective area representing the difference between the sealing areas of the upper and lower rings 86.

Force C does not vary much during the cycle of operation as the piston 95 is raised only a slight distance. In normal operation, when the receiver pressure is low or moderate, the piston is held in its lower position (Fig. 3) by the preponderance of C over A, in the absence of any substantial force B or D. When the receiver pressure (per unit area) rises to the point that force A (receiver pressure multiplied by area over which pressure acts) begins to exceed force C (spring pressure), the piston 95 rises slightly thereby bringing into play the forces B and D. The net downward force (D—B), resulting from the unseating of the nose piece 96, increases as the piston rises further until the piston comes to a position of rest in which the forces are balanced thus: $A+B=C+D$.

The transformer action controls a reduced pressure in spaces 97, 110 and 105, in relation to receiver pressure in space 94, thus: receiver pressure load on valve 95 in excess of spring load from spring 76 lifts the valve very slightly. Nose piece 96 lifts in unison with the valve and permits restricted flow of receiver air from space 94 to spaces 97 and 105 and develops a pressure in these spaces less than receiver pressure. This reduced pressure is communicated through orifice 108 to the annular space 110 between O-rings 86, where it acts downwardly on the piston as force D to arrest its upward movement, hence to limit or reduce the amount of opening of the nose piece 96 in its seat in block 58. If at some instant the reduced pressure is insufficient to arrest the upward movement of the valve due to receiver pressure in space 94, the preponderance of receiver pressure load will lift the valve slightly farther, thus opening the nose piece in its seat farther and admitting more air to passages 97 and 105. This creates additional pressure in passages 97, 108 and 110, which will arrest the upward movement of the piston when the force D becomes sufficient to do so. If at any instant the reduced pressure load D plus the spring load C is more than enough to balance the piston against the receiver pressure load A plus B, the valve will creep downward under this preponderance, further restricting the flow of receiver air past nose piece 96, hence reducing the reduced pressure in spaces 97 and 105. In this way, a definite related reduced pressure is established for a definite receiver pressure.

Since the area over which receiver pressure acts in space 94, to set up the lifting force A, is several times the effective area over which the reduced pressure acts in space 110, to set up the counteracting force D, it follows that an increase or decrease of one pound per square inch in receiver pressure can be (and is) counterbalanced only by an increase or decrease of several pounds pressure in the annular space 110 and hence in the well 105. In this way, pressure fluctuations in the receiver are transformed or amplified in the well.

Slidable in the enlarged chamber 82 is a spring loaded control plunger 109. The plunger has a stem 112 which projects with a slide fit through an end opening of the bell housing 77. Surrounding the stem is a pair of concentrically arranged springs 114, 115, the outer being heavier than the inner one. These normally load the plunger to a point short of a shoulder surrounding the end well 105 so as to provide a slight clearance 118 for collection of lubricating oil fed to the piston 109 through an oil plug 119. A drain cock, not shown, is connected to this clearance for purposes of drainage. A nut 121 threaded onto the projecting portion of the stem abuts the housing and controls the position of the piston. This nut may be threadedly adjusted, as desired, to further increase the load of the springs. Threaded further out on the projecting stem is an adjustable stop nut 122 against which abuts the nose end of a depending arm 123 of a throttle control lever. This lever is pivoted to an ear 125 of the bell housing. A relatively heavier and longer arm 126 of the control lever extends angularly away from the pivot point and tends to pivot in a counterclockwise direction. The throttle arm 126 is connected by throttle control linkage 127 to the compressor engine 10. The stop nut 122 normally restrains the throttle lever from its inclination to pivot in a counterclockwise direction.

In the operation of the apparatus described, pressure air from the high pressure discharge chamber 14 flows over piping 66 to the underside of the automatic unloader valve 74 to press the latter over passage 67. Demand pressure air from the separator tank 21 flows through the piping 56 to the automatic unloader valve chamber 64 from where it branches off into passages 79 and 93. The pressure air in branch 79 flows to the piston chamber 80 and normally holds the piston 83 seated. Pressure air in passage 93 flows to the space 94 in the manner as before mentioned.

Now, as the demand pressure air builds up excessively, here, above 85 p.s.i., and acts through space 94 upon the transformer piston 95, the latter starts to rise allowing a secondary pressure to build up in passage 104 and well 105. This build up of the secondary pressure is accompanied by bleeding of a very small quantity of the secondary air through the orifice 103 in the control plunger to the opposite side of the latter from where it escapes by vent 128 to atmosphere. The pressure at which the transformer piston 95 rises is determined by the load of the spring 76, as adjusted by the cap nut 99. As the piston rises and allows pressure air to build up in the passage 104 and well 105, the pressure building up in the latter attacks the large surface area of the control plunger 109 and progressively moves the plunger against the spring load 114, 115 causing the stop nut 122 to be carried away from the throttle arm 126, whereupon the speed of the compressor engine is proportionately throttled as the throttle arm 126 pivots counterclockwise to follow the stop nut.

As the separator tank pressure further increases and further moves the control plunger 109, the latter at a point, here of about 92 p.s.i. separator pressure, will abut the projecting end 87 of the elongated piston 83; and further pressure increase will progressively unseat the latter. Whereupon, pressure air in passage 79 is communicated with passage 88 and flows over the piping 51 to the intake valve assembly 23 (Fig. 2). Pressure air then flows to the intake piston chamber 49 and also through the by-pass 54 to the intake valve chamber 28. The piston head 36 progressively moves under this pressure towards its seat to cut down the flow of intake air through the intake opening 26. The by-pass flow 54 to the intake chamber 28 permits a small amount of air to circulate through the compressor while running unloaded.

By the foregoing arrangement, it can be seen that excessive demand air pressure acts first to throttle the compressor engine and when the demand air pressure further increases, it acts to simultaneously further throttle the compressor engine and to cut down the flow of intake air to the compressors.

The automatic unloader valve 74 (Fig. 3) functions to unload the compressors by closing the intake valve when the engine shuts down due to normal stopping, lack of fuel or emergency shut down. When the engine stops, the compression chamber 14 discharge air pressure acting on the valve 74 drops and the separator tank pressure air acting on the marginal head of the valve 74 in the space about the valve seat thereupon forces the valve open, whereupon separator tank pressure air flows over passage 67 and the pipe line 51 to the intake valve 23 to close the same. Separator tank pressure air entering the by-pass 54 into the intake chamber 28 at this time while the engine and compressors are stopped charges the compressor chambers 11, 12 and thus blocks any tendency of oil to be forced by the separator tank air pressure through the oil pump 19 to flood the compression chambers.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is intended, therefore, to claim the invention not only as shown and described but also in all such forms and modifications thereof as may be construed to fall within the spirit of the invention and the scope of the appended claims.

What is claimed is:

1. In an engine driven rotary air compressor including a compressor chamber communicating with a discharge chamber, a receiver having a non-return flow connection with the discharge chamber, an oil system for charging the compressor chamber with cooling oil through a pump powered by the engine, the oil system being of a type that is continuously subject to back pressure of receiver air so as to cause oil flooding of the compressor chamber when the engine is stopped, an intake valve operable by receiver pressure air to close off intake air to the compressor, and throttling linkage operable to throttle the engine; a regulator comprising: a housing; a plunger operable in a plunger chamber of the housing and having a stem projecting through the housing in association with the throttling linkage for operating the same upon movement of the plunger; a piston slidable in a wall of the housing, the piston having an end projecting into the plunger chamber and having an opposite end normally closing off a pressure air first inlet passage in the housing from an outlet from the housing, the said inlet passage having an external connection with the receiver, and the outlet having an external connection for conveying receiver pressure air to the compressor chamber and also receiver pressure air to close the intake valve, the piston being adapted to be moved to communicate the said inlet passage and outlet upon abutment of the plunger with the projecting end of the piston subsequent to the plunger having been moved a specific distance; valve means for communicating operating pressure air from a branch passage of the inlet passage to the plunger to move the latter; an unloader valve chamber in the housing having connection with the first inlet passage, with the outlet, and with a second inlet to the housing that has a direct external connection with the discharge chamber of the compressor; an unloader valve slidable in the unloader valve chamber having a head end subject to action of receiver pressure air in the first inlet and having a bottom end subject to action of pressure air from the discharge chamber over the second inlet; and a spring load acting upon the bottom end of the unloader valve adapted together with the load of the pressure air from the discharge chamber as a supplement to hold the head end of the latter valve seated over the said outlet against a counteracting load of receiver pressure air in the first inlet.

2. In the apparatus as defined in claim 1, wherein the plunger is operable in the plunger chamber against a resisting spring load.

3. In the apparatus defined in claim 1, wherein the projecting end of the stem carries a stop nut restraining pivoting movement of a pivoted operating lever of the throttling mechanism.

4. In the apparatus as defined in claim 1, wherein the plunger is operable in the plunger chamber against a resisting spring load and is operable to move against the spring load an initial distance under operating pressure air of a specific value to effect operation of the throttling linkage, and is operable to move a further distance in abutment with the piston under operating pressure air of greater value so as to effect simultaneously further operation of the throttling linkage and a closing operation of the intake valve.

5. In the apparatus as defined in claim 1, wherein the valve means is spring loaded to closed position and is operable by the operating receiver pressure air in the branch passage upon the latter building up to a specific value.

6. In the apparatus as defined in claim 1, wherein the valve means is operable by operating receiver pressure air in the branch passage upon the latter attaining a predetermined value and is characterized by a valve body having peripheral resilient O-rings arranged thereon, and by means for conducting pressure air from the branch passage to the O-rings to pressurize the latter into resilient sealing engagement with adjoining wall means, whereby leakage of pressure air past the valve body is blocked.

7. In apparatus of the character described including an engine driven air compressor, a demand receiver connected to a discharge pressure chamber of the compressor, a check valve blocking return flow from the receiver to the discharge chamber, an intake valve operable by pressure air from the receiver to cut off air intake to the compressor, and throttling linkage operable to throttle the engine; a regulator for controlling operation of the intake valve and of the throttling linkage, comprising: a housing; means in the housing associated with receiver for responding to variations of pressure in the pressure air of the receiver so as to effect operation of the throttling linkage; other means in the housing for operation by the latter means subsequent to a predetermined variation in pressure of the pressure air of the receiver so as to communicate operating pressure air from the receiver to the intake valve; and fluid pressure responsive means in the housing in fluid communication with the receiver, with the compressor discharge chamber, and with the intake valve for responding to a drop below a predetermined value of pressure in the pressure air of the compressor discharge chamber to communicate operating receiver pressure air to the intake valve.

References Cited in the file of this patent

UNITED STATES PATENTS

| 385,941 | McCarthy | July 10, 1888 |
| 1,663,530 | Metzgar | Mar. 20, 1928 |
| 2,234,470 | Dick | Mar. 11, 1941 |
| 2,476,048 | Lamberton | July 12, 1949 |
| 2,546,612 | Paget | Mar. 27, 1951 |
| 2,546,613 | Paget | Mar. 27, 1951 |
| 2,641,405 | Valley | June 9, 1953 |
| 2,661,893 | Valley | Dec. 8, 1953 |
| 2,783,936 | Kistler | Mar. 5, 1957 |
| 2,841,321 | Boyce | July 1, 1958 |

FOREIGN PATENTS

| 984,675 | France | July 9, 1951 |